(12) United States Patent
Tseng et al.

(10) Patent No.: US 8,299,657 B2
(45) Date of Patent: Oct. 30, 2012

(54) LINEAR MOTOR

(75) Inventors: Te Sheng Tseng, Taichung (TW); Chen Yi Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 541 days.

(21) Appl. No.: 12/656,037

(22) Filed: Jan. 14, 2010

(65) Prior Publication Data
US 2011/0062800 A1 Mar. 17, 2011

(30) Foreign Application Priority Data
Sep. 15, 2009 (TW) .............................. 98131025 A (51) Int. Cl.
*H02K 41/03* (2006.01)
(52) U.S. Cl. ..................................... 310/12.16; 359/814
(58) Field of Classification Search ............... 310/12.16, 310/15, 31, 36; 359/811–824
See application file for complete search history.

(56) References Cited

U.S. PATENT DOCUMENTS

| 7,851,952 | B2 * | 12/2010 | Liao ........................... 310/12.16 |
| 8,218,062 | B2 * | 7/2012 | Tseng et al. .................. 348/345 |
| 2007/0108847 | A1 * | 5/2007 | Chang ............................ 310/12 |
| 2008/0164771 | A1 * | 7/2008 | Huang ............................ 310/12 |

* cited by examiner

*Primary Examiner* — Nguyen N Hanh
(74) *Attorney, Agent, or Firm* — Bacon & Thomas, PLLC (57) ABSTRACT

This invention provides a linear motor at least including an electrically controlled actuator and an elastic member. The electrically controlled actuator at least comprises a fixed element, a movable element, and an electrical unit, and at least provides an axial displacement. The elastic member at least comprises a fixed portion, a movable portion, an elastic portion, and a pair of power supply terminals. The fixed portion of the elastic member is connected to the fixed element of the actuator. The movable portion of the elastic member is connected to the movable element of the actuator. Various portions of the elastic member have different thicknesses depending on desired stiffness of each portion, such that the elastic member can be thinned to facilitate miniaturization of the linear motor. The needs to have an elastic member with desired stiffness and to provide good electrical contact are both met by the present linear motor.

7 Claims, 7 Drawing Sheets

LINEAR MOTOR

BACKGROUND OF THE INVENTION

1. Field of the Invention

The present invention relates to a linear motor.

2. Description of the Related Art

Figure 1:
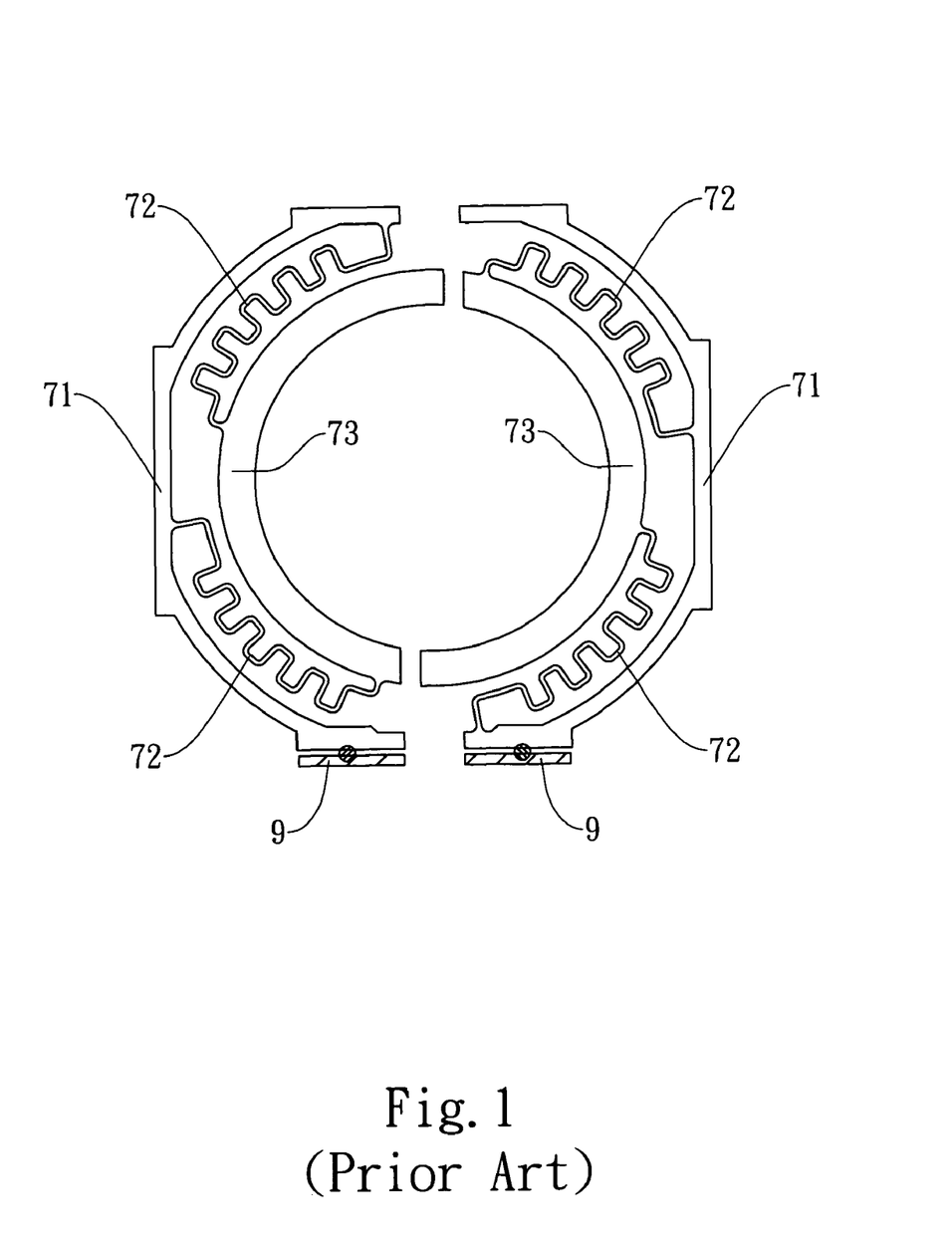
FIG. 1 shows a top view of a prior art elastic member.
Figure 2:
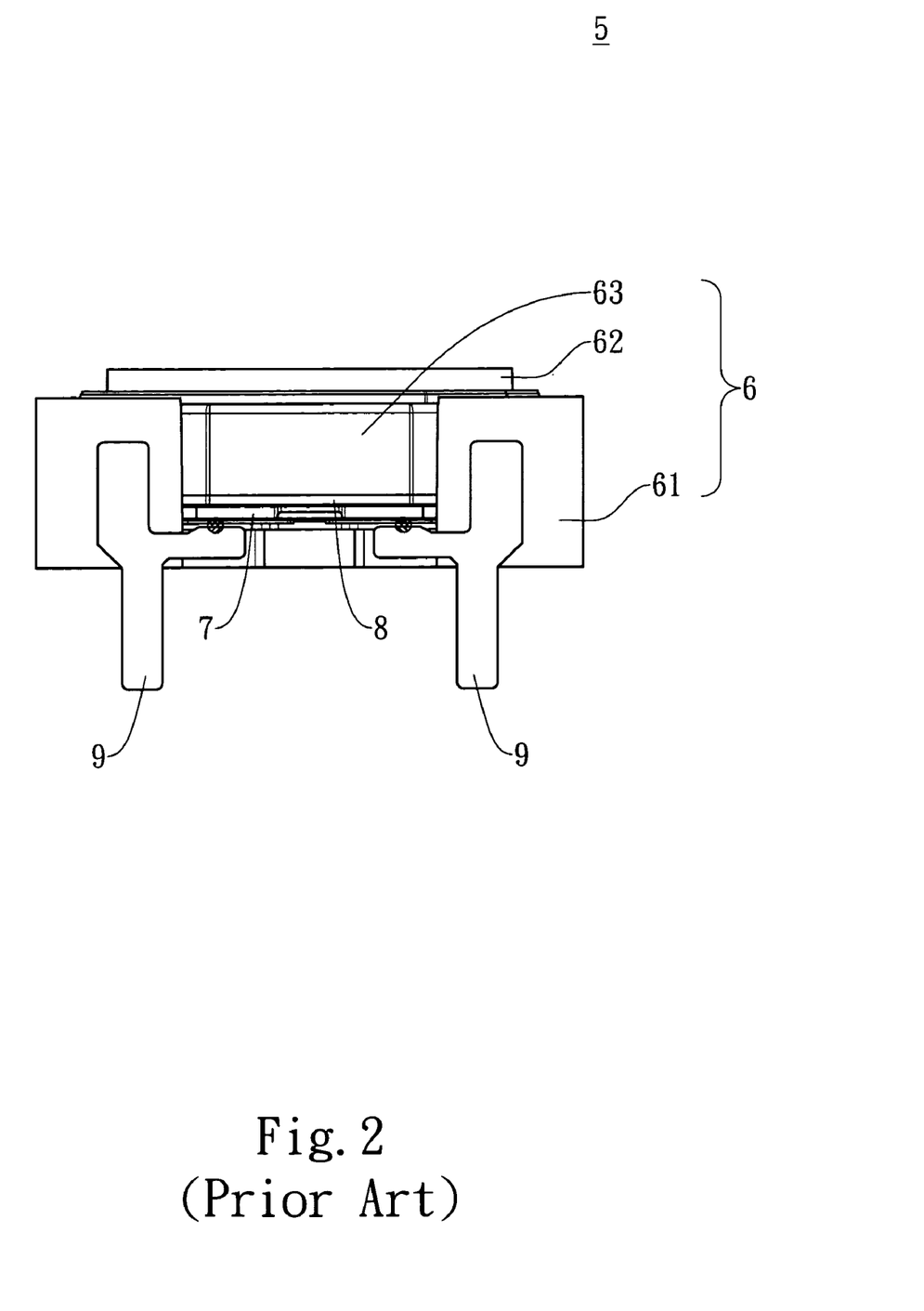
FIG. 2 shows a front view of a prior art linear motor.

Referring to FIG. 2, a front view of a prior art linear motor 5 is shown. The linear motor 5 includes: an electrically controlled actuator 6, an elastic member 7 connected to the electrically controlled actuator 6, an insulating piece 8 positioned above the elastic member 7, and a pair of power supply terminals 9 soldered to the elastic member 7. The electrically controlled actuator 6 comprises a fixed element 61, a movable element 62 positioned on the fixed element 61, and an electrical unit 63 positioned around the outside of the movable element 62. FIG. 1 shows a top view of a prior art elastic member 7 as described above, which comprises a fixed portion 71, an elastic portion 72 linked to the fixed portion 71, and a movable portion 73 connected to the elastic portion 72. As shown in FIG. 2, the elastic member 7 and the insulating piece 8 are positioned sequentially between the fixed element 61 and the movable element 62 of the electrically controlled actuator 6. The insulating piece 8 prevents the elastic member 7 from electrically communicating with other metal components; moreover, the insulating piece 8 provides additional strength to press on the elastic member 7 so that it can be secured at a proper position.

The fixed portion 71 of the elastic member 7 is connected to the fixed element 61 of the actuator 6. The movable portion 73 of the elastic member 7 is connected to the movable element 62 of the actuator 6. The pair of power supply terminals 9 and the elastic member 7 are soldered together, while the elastic portion 72 also electrically communicates with the electrical unit 63 of the actuator 6 to transmit electricity thereto. When an external power source (not shown) is coupled to the pair of power supply terminals 9, power will flow sequentially through the terminals 9 and the elastic member 7 to the electrical unit 63 of the actuator 6, thereby leading to an axial displacement of the movable element 62. This axial displacement then moves the movable portion 73 of the elastic member 7, further leading to a linear displacement of the elastic portion 72.

Figure 3:
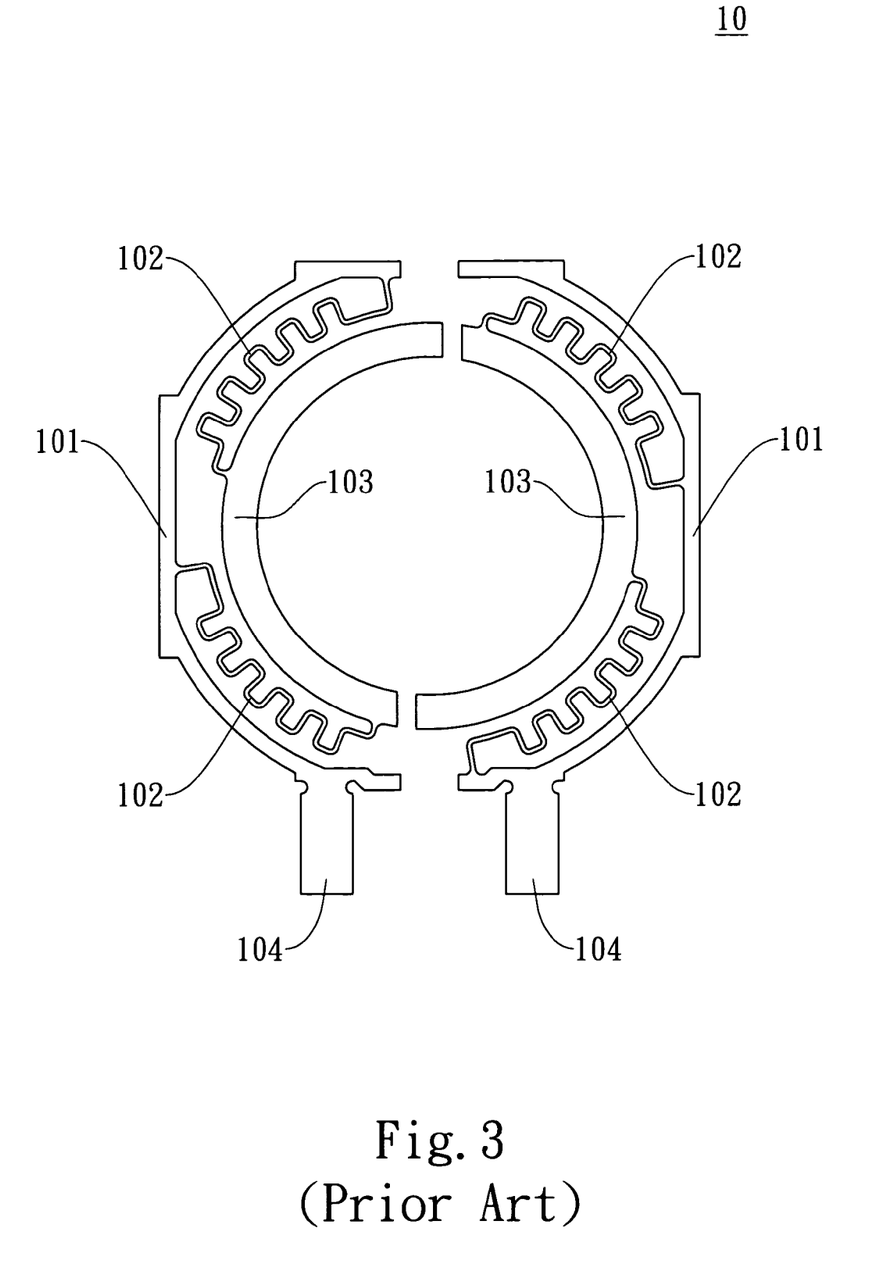
FIG. 3 shows a top view of another prior art linear motor.

FIG. 3 shows a top view of another prior art elastic member 10. A pair of power supply terminals 104 is formed integrally into the elastic member 10 to become one piece; hence, the step in which terminals 104 are soldered to the elastic member 10 can be eliminated. The elastic member 10 comprises a fixed portion 101, an elastic portion 102, a movable portion 103, and a pair of power supply terminals 104.

Both of the prior art elastic member 7 and 10 described above are flat springs with an even thickness. As miniaturization is a continuing trend in the production of electronic products, components like the elastic members 7 and 10 may be required to have smaller spring constants, and their thicknesses will become smaller as a result. However, as the spring constant of an elastic member reduces, so does its stiffness; in consequence, the elastic member tends to rupture more easily. It is thus important to manage the balance between the spring constant and the stiffness of an elastic member, particularly in a design where the elastic member and power supply terminals are combined together. In this kind of design, generally, the elastic member is expected to have a relatively small spring constant; however, this may lead to a smaller stiffness for the power supply terminals. Since power supply terminals may have to be bent during assembly, they will be subject to rupture more easily with a smaller stiffness, thereby causing wastes that increase the production cost. Moreover, as the elastic member 10 and the power supply terminals 104 both become thinner, poor electrical contact between the terminals 104 and an external power source tend to happen more frequently.

As such, there exists a need in the art to develop an improved elastic member that has a reduced thickness and overcomes the drawback of easy rupturing and poor electrical contact at the power supply terminals on the elastic member. Such an improved elastic member may effectively lower the production cost accordingly.

SUMMARY OF THE INVENTION

An object of the present invention is to provide a linear motor that includes an electrically controlled actuator and an elastic member. The various portions of the elastic member have different thicknesses depending on desired stiffness of each portion, such that the elastic member can be thinned so as to facilitate miniaturization of the linear motor. The needs to have an elastic member with desired stiffness and to provide good electrical contact are both met by a linear motor of the present invention.

To achieve the above object, the present invention provides a linear motor at least including an electrically controlled actuator and an elastic member, the electrically controlled actuator at least comprising a fixed element, a movable element positioned within the fixed element and an electrical unit positioned around the outside of the movable element, and the elastic member at least comprising a fixed portion, an elastic portion linked to the fixed portion, a movable portion linked to the elastic portion and a pair of power supply terminals linked to the fixed portion. In the linear motor of the present invention, the elastic member is positioned between the fixed element and the movable element of the actuator, the elastic member electrically communicates with the electrical unit of the actuator, the fixed portion of the elastic member is connected to the fixed element of the actuator, the movable portion of the elastic member is connected to the movable element of the actuator, and the thickness of the fixed portion is different from that of the elastic portion. Power from an external power source is input to the electrical unit through the pair of power supply terminals, leading to an axial displacement of the movable element of the actuator and a linear displacement of the elastic portion of the elastic member.

DETAILED DESCRIPTION OF THE PREFERRED EMBODIMENTS

The present invention now will be described more fully hereinafter with reference to the accompanying drawings, in which preferred embodiments of the invention are shown. It is to be understood that all kinds of alterations and changes can be made by those skilled in the art without deviating from the spirit and the scope of the invention. This description is not to be taken in a limiting sense, but is made merely for the purpose of illustrating the general principles of the invention.

Figure 4:
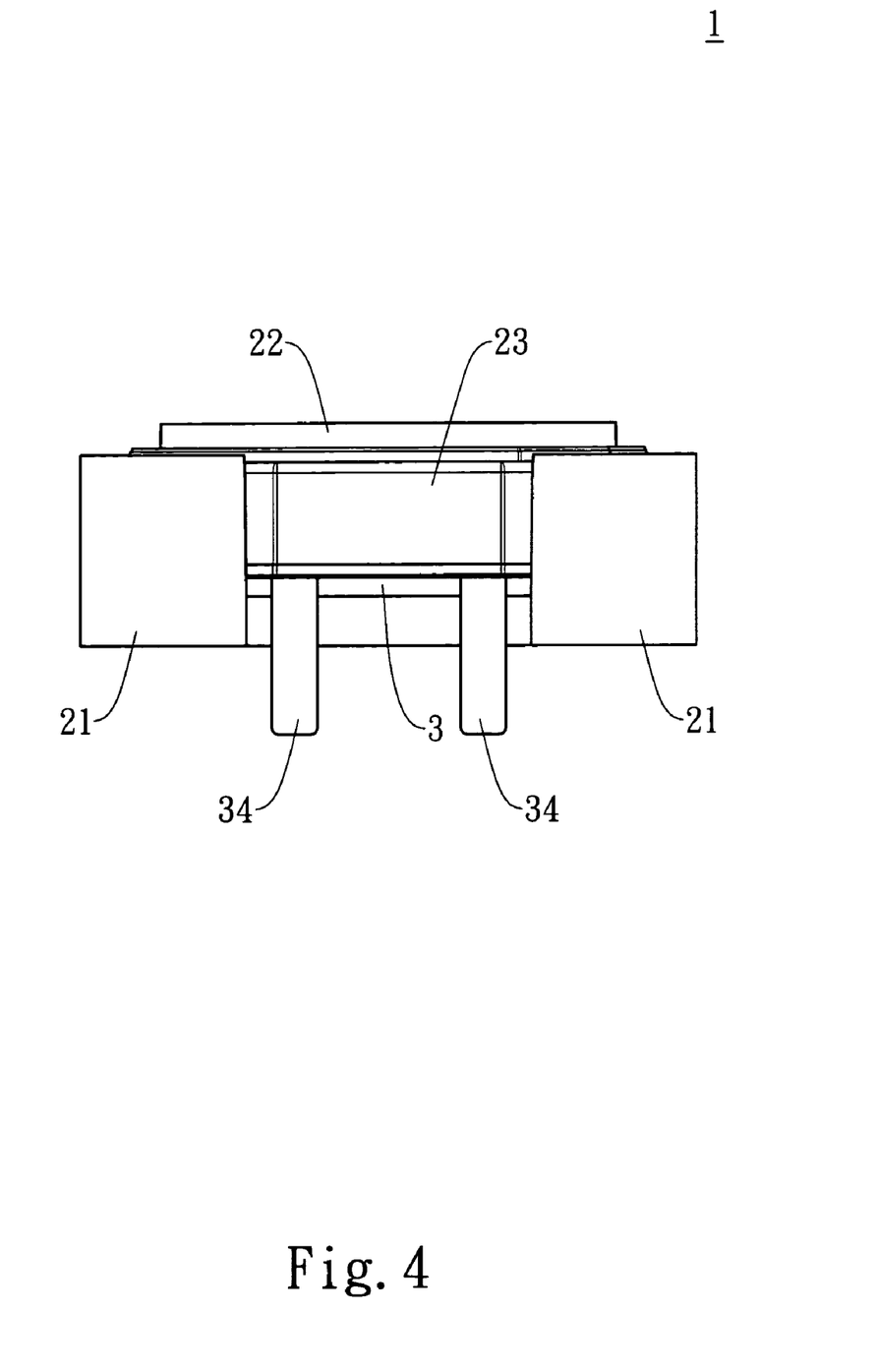
FIG. 4 shows a front view of a linear motor according to the present invention.
Figure 5:
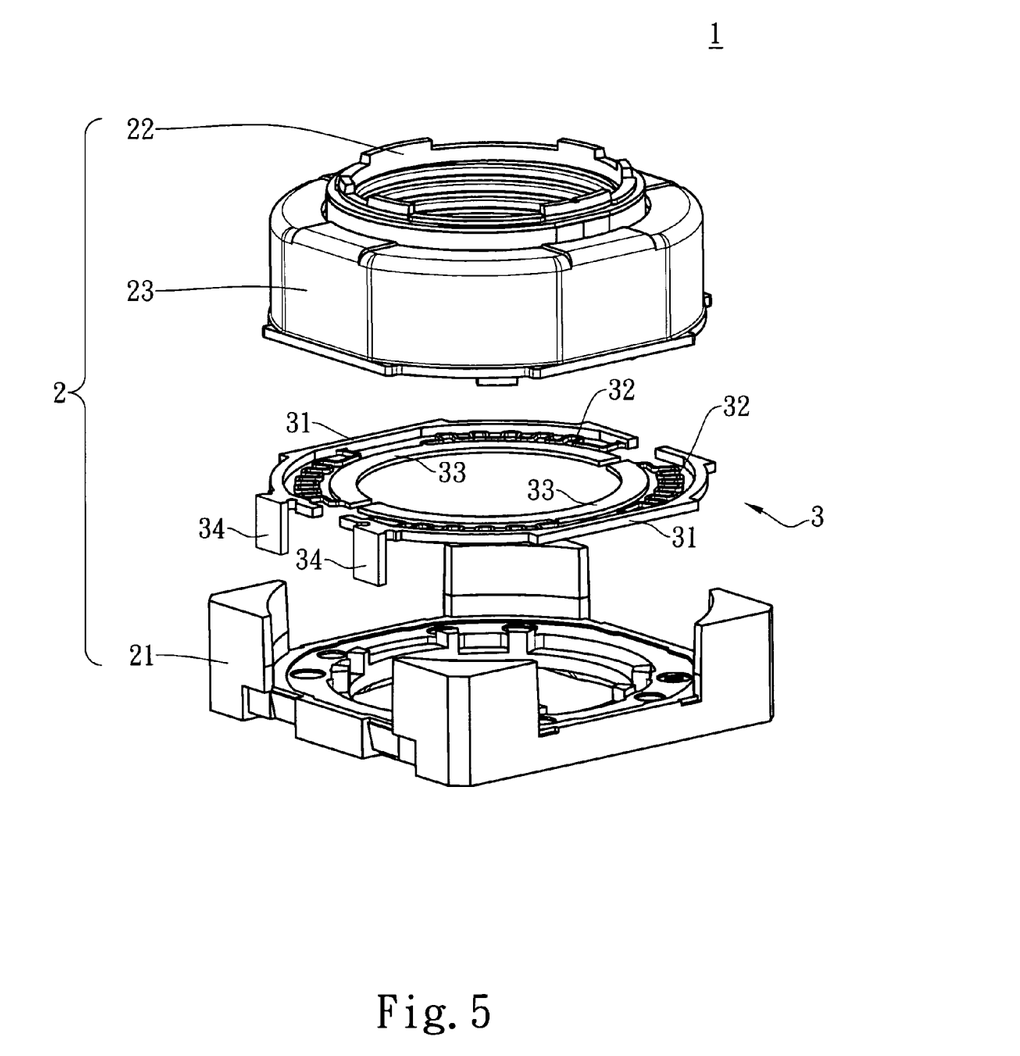
FIG. 5 shows a perspective view of the linear motor according to the present invention.

FIGS. 4 and 5, respectively, show a front view and a perspective view of a linear motor 1, which is a preferred embodiment of the present invention. The linear motor 1 at least includes an electrically controlled actuator 2 and an elastic member 3. The electrically controlled actuator 2 at least comprises a fixed element 21, a movable element 22 positioned within the fixed element 21, and an electrical unit 23 positioned around the outside of the movable element 22. The elastic member 3 at least comprises a fixed portion 31, an elastic portion 32 linked to the fixed portion 31, a movable portion 33 linked to the elastic portion 32, and a pair of power supply terminals 34 linked to the fixed portion 31.

The elastic member 3 is positioned between the fixed element 21 and the movable element 22 of the actuator 2. The elastic member 3 electrically communicates with the electrical unit 23 of the actuator 2. The fixed portion 31 of the elastic member 3 is connected to the fixed element 21 of the actuator 2. The movable portion 33 of the elastic member 3 is connected to the movable element 22 of the actuator 2. When power from an external power source (not shown) is input to the electrical unit 23 of the actuator 2 through the pair of power supply terminals 34, an axial displacement of the movable element 22 of the actuator 2 occurs, which then moves the movable portion 33 of the elastic member 3. And the movement of the movable portion 33 further leads to a linear displacement of the elastic portion 32 of the elastic member 3.

Figure 6A:
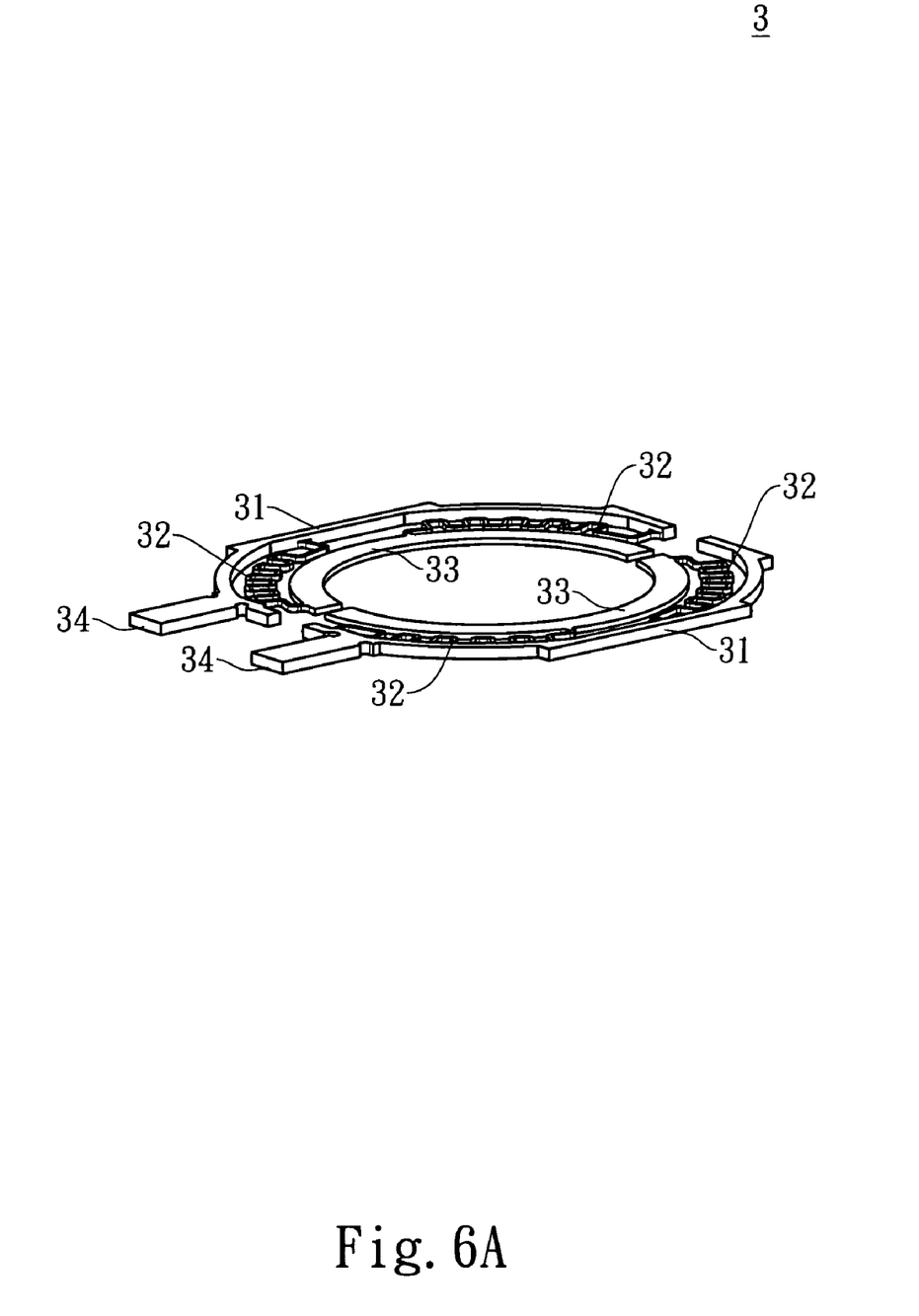
FIG. 6A shows a perspective view of an elastic member according to the present invention where its pair of power supply terminals is not bent.
Figure 6B:
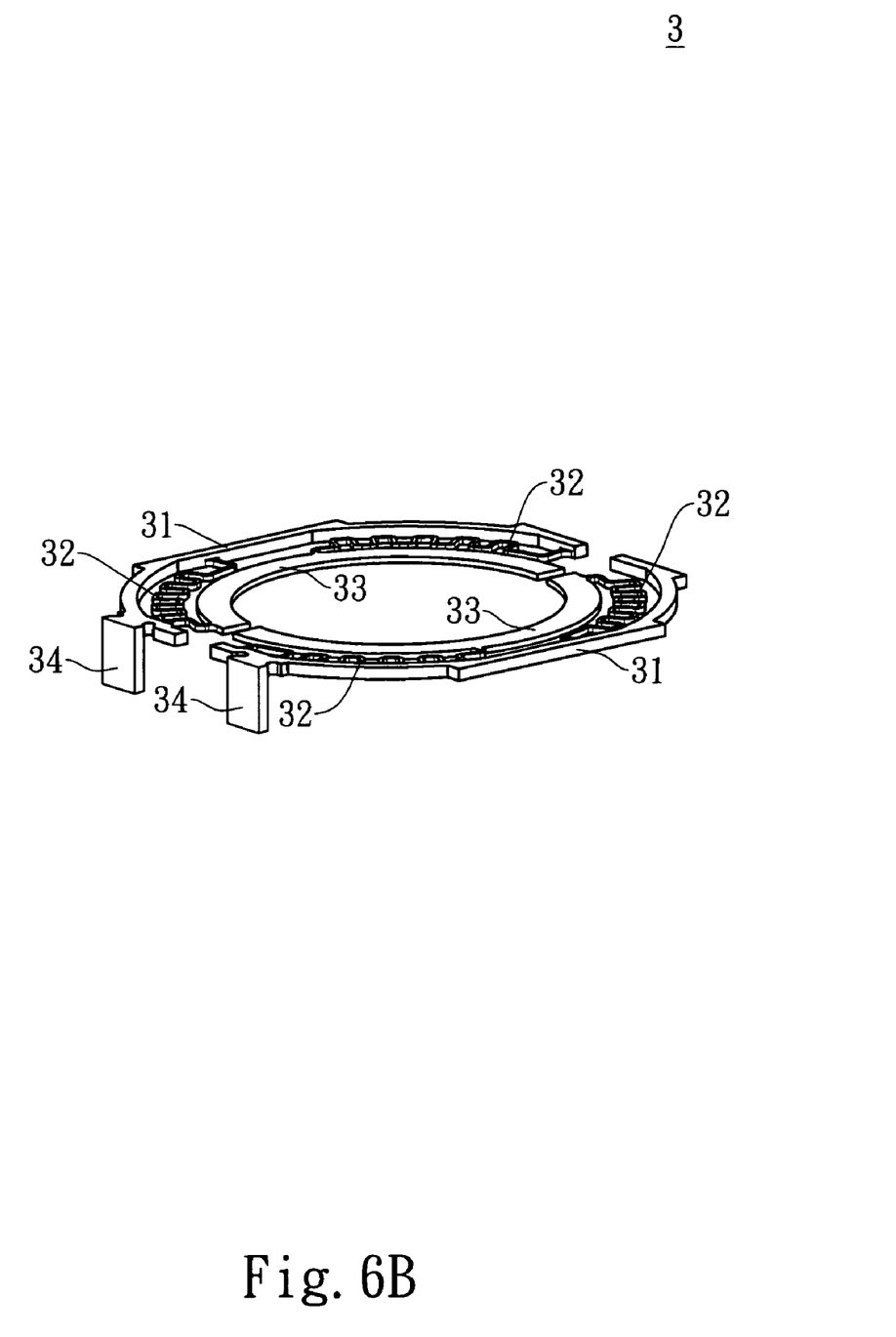
FIG. 6B shows a perspective view of the elastic member according to the present invention, where its pair of power supply terminals has been bent.

FIGS. 6A and 6B, respectively, show a perspective view of the elastic member 3. In FIG. 6A, the pair of power supply terminals 34 of the elastic member 3 is not bent, while in FIG. 6B, the terminals 34 have been bent. The pair of power supply terminals 34 is formed integrally into the elastic member 3 to become one piece with the thicknesses varied in the various portions of the elastic member 3, to achieve the desired stiffness of the terminals 34 and enhance its stability after assembly. As the terminals 34 are in a bending condition due to the assembly and connection of the elastic member 3 and the electrically controlled actuator 2, it is necessary for the terminals 34 of the elastic member 3 to have proper stiffness to avoid rupture under the bending condition and to maintain stability.

In the elastic member 3 of this embodiment, the thickness of the fixed portion 31 is different from that of the elastic portion 32. The various portions of the elastic member 3 may have different thicknesses depending on desired stiffness of each portion. During fabrication, for example, the elastic member 3 may first be formed by an etching process that is remaining the thickness of the base material as the stiffness required for the structure of the elastic member and half-etching some parts of the elastic member 3 to reduce the thickness of the elastic portion 32, thereby acquiring the desired spring constant for the elastic portion 32. In addition, the surface of the elastic member 3 may be covered with an insulating layer (not shown) using plating, so as to avoid electrical communication between the surface and other metal components (not shown). Replacing an insulating piece as used in the prior art technique with coating the surface of the elastic member can achieve the decrease in the number of components and reduce the production cost.

In the present invention, the electrically controlled actuator 2 of the linear motor 1 may use a VCM (Voice Coil Motor) or shape memory alloy structure; the elastic member 3 may be formed by an etching or electroforming process.

The linear motor of the present invention has the following advantages:

1. The power supply terminals are formed integrally into the elastic member to become one piece, and hence, the step of soldering terminals can be eliminated during assembly. As a result, the number of components, the difficulty caused during assembly, and the overall production cost can all be reduced.

2. To achieve the desired spring constant for the elastic member, the layout design and selection of material may be used to make adjustments, and also, controlling the degree of half-etching in forming the elastic portion may help the adjustment of the spring constant. With the elastic member having different thicknesses at various portions, both the stiffness of the power supply terminals and the stability after assembly can be enhanced.

3. The elastic member may be covered with an insulating layer using plating. Thus, electrical communication with other metal components can be avoided, and the number of components can be reduced as insulating pieces are not required. Meanwhile, the difficulty caused during assembly and the overall production cost can be reduced as well.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. A linear motor, at least including an electrically controlled actuator and an elastic member,
the electrically controlled actuator at least comprising:
a fixed element,
a movable element positioned within the fixed element, and
an electrical unit positioned around the outside of the movable element; and
the elastic member at least comprising:
a fixed portion,
an elastic portion linked to the fixed portion,
a movable portion linked to the elastic portion, and
a pair of power supply terminals linked to the fixed portion,
wherein the elastic member is positioned between the fixed element and the movable element of the actuator, the elastic member electrically communicates with the electrical unit of the actuator, the fixed portion of the elastic member is connected to the fixed element of the actuator, the movable portion of the elastic member is connected to the movable element of the actuator, and the thickness of the fixed portion is different from that of the elastic portion; and wherein power from an external power source is input to the electrical unit through the pair of power supply terminals that leads to an axial displacement of the movable element of the actuator and a linear displacement of the elastic portion of the elastic member.

2. The linear motor according to claim 1, wherein the elastic member is formed by an etching process.

3. The linear motor according to claim 1, wherein the elastic member is formed by an electroforming process.

4. The linear motor according to claim 1, wherein the elastic member is formed in one piece.

5. The linear motor according to claim 1, wherein the electrically controlled actuator uses a VCM structure.

6. The linear motor according to claim 1, wherein the electrically controlled actuator uses a shape memory alloy structure.

7. The linear motor according to claim 1, wherein the surface of the elastic member is covered with an insulating layer using plating.

* * * * *